(12) United States Patent
Kobayashi et al.

(10) Patent No.: US 7,571,543 B2
(45) Date of Patent: Aug. 11, 2009

(54) METHOD OF MANUFACTURING A RETAINER FOR A ROLLER BEARING

(75) Inventors: Kazuto Kobayashi, Kanagawa (JP);
Toshio Nakamura, Kanagawa (JP);
Keiichi Horino, Kanagawa (JP);
Yoshiro Ide, Kanagawa (JP)

(73) Assignee: NSK Ltd., Tokyo (JP)

( * ) Notice: Subject to any disclaimer, the term of this patent is extended or adjusted under 35 U.S.C. 154(b) by 347 days.

(21) Appl. No.: 10/567,568

(22) PCT Filed: Aug. 6, 2004

(86) PCT No.: PCT/JP2004/011635
§ 371 (c)(1),
(2), (4) Date: Feb. 8, 2006

(87) PCT Pub. No.: WO2005/015038
PCT Pub. Date: Feb. 17, 2005

(65) Prior Publication Data
US 2006/0204158 A1    Sep. 14, 2006

(30) Foreign Application Priority Data
Aug. 8, 2003 (JP) .............................. 2003-290455
Jul. 20, 2004 (JP) .............................. 2004-210946

(51) Int. Cl.
*B21K 1/05* (2006.01)
*B21D 53/12* (2006.01)
*F16C 33/48* (2006.01)

(52) U.S. Cl. .............................. 29/898.067; 29/898.065; 29/898.064; 384/572; 384/574

(58) Field of Classification Search ............... 29/898, 29/898.042, 898.043, 898.044, 898.045, 29/898.065, 898.067, 412, 413, 414, 418, 29/439; 384/523, 531, 558, 560, 572, 575
See application file for complete search history.

(56) References Cited

U.S. PATENT DOCUMENTS

| 1,602,350 A | * | 10/1926 | Fernstrom ................. 384/532 |
| 3,240,543 A | * | 3/1966 | Benson ..................... 384/623 |
| 5,234,274 A | | 8/1993 | Honda et al. |

FOREIGN PATENT DOCUMENTS

| DE | 21 46 056 A1 | 3/1973 |
| DE | 4140161 A1 * | 6/1993 |
| JP | 54-42551 A | 4/1979 |
| JP | 1-158820 U | 11/1989 |
| JP | 2000-2247 A | 1/2000 |
| JP | 2000-104737 A | 4/2000 |
| JP | 2001-388440 A | 2/2001 |
| JP | 2001-153143 A | 6/2001 |

* cited by examiner

*Primary Examiner*—David P Bryant
*Assistant Examiner*—Sarang Afzali
(74) *Attorney, Agent, or Firm*—Sughrue Mion, PLLC

(57) ABSTRACT

A method of manufacturing a retainer for a roller bearing made of a metal plate and has a tubular main portion, pockets formed in the main portion intermittently concerning a circumferential direction and capable of retaining rollers rollably, and an outwardly oriented flange-like collar portion. An annular intermediate material is formed by die cutting the metal plate, and after a second intermediate material is formed by forming through holes in the intermediate material intermittently, a portion of the second intermediate material excluding a radially outer end portion is plastically deformed into a tubular shape. The portion plastically deformed tubular shape is formed as the main portion, a portion corresponding to the radially outer end portion of the second intermediate material is formed as the collar portion or a collar portion element for forming the collar portion, and portions corresponding to the through holes are formed as the pockets.

4 Claims, 13 Drawing Sheets

METHOD OF MANUFACTURING A RETAINER FOR A ROLLER BEARING

TECHNICAL FIELD

1. Field of the Invention

The present invention relates to improvements in a retainer for a roller bearing for rollably retaining a plurality of rollers by being incorporated into a roller bearing, and a method of manufacturing the retainer for a roller bearing.

2. Background Art

A roller bearing which uses rollers as rolling elements has a large withstand load (load capacity), so that the roller bearing is used in a portion where a relatively large load is applied among rotatively supporting portions which make up various machine equipment. FIG. 11 shows an example of a self-aligning roller bearing which is one kind of such roller bearings. This self-aligning roller bearing is constructed such that a plurality of barrel rollers 3, 3 are rollably arranged between an outer ring 1 and an inner ring 2 which are assembled concentrically in a neutral state, and a measure is provided for preventing the separation of the barrel rollers 3, 3 by retainers 4, 4 formed by subjecting a metal plate to press working.

An outer ring race 5 which is a spherical concave surface having a single center is formed on an inner peripheral surface of the outer ring 1 of these members. In addition, a pair of inner ring races 6, 6, which respectively oppose the outer ring race 5, are formed on an outer peripheral surface of the inner ring 2. In addition, the plurality of barrel rollers 3, 3 are each formed in a symmetrical shape in which a maximum diameter portion thereof is located in an axially central portion of each of these barrel rollers 3, 3, and the plurality of barrel rollers 3, 3 are rollably arranged in two rows between the outer ring race 5 and the pair of inner ring races 6, 6.

In addition, as shown in FIGS. 11 to 15, each of the retainers 4, 4 has a conical tube-shaped main portion 7, and an outwardly oriented flange-like large diameter-side collar portion 8 which is bent diametrically outwardly from a large diameter-side edge portion of this main portion 7. A plurality of pockets 10, 10 are formed in the main portion 7 intermittently concerning the circumferential direction, and each of the barrel rollers 3, 3 is rotatably retained in each of these pockets 10, 10. It should be noted that the main portion 7 is located on the diametrical inner side of the pitch circle (a circle connecting central axes of these barrel rollers 3, 3) of the plurality of barrel rollers 3, 3, with the result that the barrel rollers 3, 3 are prevented from coming out to the diametrically inner side of the main portion 7 through the pockets 10, 10. In addition, outer peripheral edges of the large diameter-side collar portions 8, 8 of the pair of retainers 4, 4 are respectively guided by being brought into sliding contact with an inner peripheral surface of a guide ring 11. This guide ring 11 is rotatably provided between the barrel rollers 3, 3 which are provided in two rows concerning the axial direction.

In addition, a circular or an annular recessed portion 12 is formed in at least that portion of each of both end faces of each of the plurality of barrel rollers 3, 3 which opposes the large diameter-side collar portion 8. Further, tongues 13 are each formed at a circumferentially intermediate position of each of the pockets 10, 10 at an inner peripheral edge of the large diameter-side collar portion 8. These tongues 13 are formed in a state in which they project from the inner peripheral edge of the large diameter-side collar portion 8 toward the diametrically inner side and are bent from the large diameter-side collar portion 8 toward the one end face of the barrel roller 3 on each pocket 10 side. A distal end portion of each tongue 13 is engaged with the recessed portion 12 formed in the end face of this barrel roller 3 by means of a retaining allowance 6 shown in FIG. 13 when the barrel roller 3 is built on the inner side of the pocket 10, thereby preventing the barrel roller 3 from coming off from inside the pocket 10 toward the radially outer side of the retainer 4. In consequence, the barrel roller 3 which is rotatably retained in this pocket 10 is prevented from coming off from inside the pocket 10 in either an inward or outward direction concerning the diametrical direction even before the barrel roller 3 is built in between the inner peripheral surface of the outer ring 1 and the outer peripheral surface of the inner ring 2.

In a case where a rotating shaft is pivotally supported inside a housing by the self-aligning roller bearing constructed as described above, the outer ring 1 is fitted in and fixed to this housing, and the inner ring 2 is fitted over and fixed to the rotating shaft. In a case where this inner ring 2 rotates together with this rotating shaft, the plurality of barrel rollers 3, 3 roll to allow this rotation. In a case where the axis of the housing and the axis of the rotating shaft are misaligned, the inner ring 2 undergoes alignment inside the outer ring 1, thereby compensating for this misalignment. Since the outer ring race 5 is formed into a single spherical shape, the rolling of the plurality of barrel rollers 3, 3 is effected smoothly after the compensation of the misalignment.

Next, referring to FIG. 16, a description will be given of a method of manufacturing the retainer 4 which is incorporated into the above-described self-aligning roller bearing, and which is conventionally known through such as the disclosure of JP-A-2000-2247. First, after an unillustrated first intermediate material of a disk shape is formed by subjecting a metal plate to die cutting by means of a press, a bottomed, truncated cone-shaped second intermediate material 14 is formed by subjecting this first intermediate material to drawing, as shown in FIG. 16A. Then, a bottom portion 15 of this second intermediate material 14, excluding the radially outer portion, is punched by the press, thereby forming a third intermediate material 16 as is shown in FIG. 16B. Then, a plurality of through holes 18 (only one is shown in FIG. 16C; and not shown in FIG. 16D and onwards which will be referred to later) are formed in a conical tube-shaped portion 17 of this third intermediate material 16 intermittently concerning the circumferential direction, thereby forming a fourth intermediate material 19 as is shown in FIG. 16C. It should be noted that, at this juncture, while the rotation and the stopping of the third intermediate material 16 are being alternately effected, the through holes 18 are formed one at a time in the conical tube-shaped portion 17 during the stopping. Namely, during the formation of the through holes 18, the third intermediate material 16 is intermittently rotated by gripping portions of the bottom portion 15 by chucks, thereby consecutively replacing that portion of the conical tube-shaped portion 17 which is positioned at a working section for forming these through holes 18. In addition, at the time of forming these through holes 18, tongue elements 20 are each formed at a widthwise central portion of one end (an upper end in FIG. 16C) of each of these through holes 18.

Next, a distal end portion 21 of the conical tube-shaped portion 17 is bent radially outwardly by a predetermined amount (until the angle of inclination of this distal end portion 21 with respect to the central axis of this conical tube-shaped portion 17 becomes 60 degrees or thereabouts) by the press, thereby forming a fifth intermediate material 22 as is shown in FIG. 16(D). Subsequently, the distal end portion 21 is further bent radially outwardly by a predetermined amount (until the aforementioned angle of inclination becomes 90 degrees plus) by the press to form an outwardly oriented flange-like, large diameter-side collar portion element 23, thereby forming a sixth intermediate material 24 as is shown in FIG. 16(E). It should be noted that, in this state, of the conical tube-shaped portion 17, a portion other than the portion which becomes the large diameter-side collar portion element 23 becomes the main portion 7. At the same time, portions corresponding to the through holes 18 become the pockets 10, 10 (not shown in FIG. 16(E) and FIGS. 16(F) to 16(I) which will be referred to later; see FIGS. 11 to 15). Next, the outside diameter of the large diameter-side collar portion element 23 is adjusted by subjecting the large diameter-side collar portion element 23 to trimming, thereby forming the large diameter-side collar portion 8. At the same time, the entire remaining portion of the bottom portion 15 is punched by the press, thereby forming a seventh intermediate material 25 as is shown in FIG. 16(F).

Next, an abutment surface which is one side surface (upper surface in FIG. 16F) of the large diameter-side collar portion 8 is adjusted into a desired shape by such as surface pressing by the press, thereby forming an eighth intermediate material 26 as is shown in FIG. 16G. Next, peripheral edge portions of the pockets 10, 10 (FIGS. 11 to 15) are adjusted to a desired shape and size by such as surface pressing by the press, thereby forming a ninth intermediate material 27 as is shown in FIG. 16H. Finally, the tongue elements 20 are bent by a predetermined amount in a direction in which the distal end portions of the tongue elements 20 project from the other side surface (lower surface in FIG. 16H) of the large diameter-side collar portion 8 so as to form the tongues 13, thereby obtaining the retainer 4 as is shown in FIG. 16I. It should be noted that there are cases where in the forming process from FIG. 16H to FIG. 16I, projecting portions for guiding the barrel rollers 3, 3 are press formed at those portions of the other side surface of the large diameter-side collar portion 8 which oppose those portions of the end faces of the barrel rollers 3, 3 which are offset from the aforementioned recessed portions 12, 12.

If the retainer 4 having the large diameter-side collar portion 8 such as the one shown in FIGS. 11 to 15 is fabricated in the steps shown in FIGS. 16A to 16I, an increase in the manufacturing cost is unavoidable. Namely, in the case of the conventional manufacturing method shown in FIGS. 16A to 16I, despite the fact that the final shape of the large diameter-side collar portion 8 is annular, after the radially outer end portion of the annular first intermediate material (not shown) is plastically deformed into the shape of a conical tube, as shown in FIGS. 16A to 16C, the large diameter-side collar portion 8 is formed by being plastically deformed again into the annular shape, as shown in FIGS. 16D and 16E. For this reason, the working efficiency is poor, and the working time becomes long, so that the manufacturing cost increases.

In addition, the plurality of through holes 18 are formed to form the pockets 10, 10, as shown in FIGS. 16B and 16C, the operation of forming these through holes 18 must be performed while intermittently rotating the third intermediate material 16 or the fourth intermediate material 19 by predetermined degrees. For this reason, not only does the working time become long, a precise indexing operation is required, so that the cost increases. Although it is possible to perform the operation of forming the plurality of through holes 18 simultaneously so as to shorten the working time, a complex and large-scale working apparatus is required, so that this also constitutes a factor for higher cost.

It should be noted that the drawback concerning such formation of the pockets similarly occurs in the case of manufacturing a retainer 4a which does not have collars at both end portions of the main portion 7, such as the one shown in FIG. 17 (although the shape of pockets 10a, 10a of the retainer 4a is rectangular in the illustrated example, the shape does not matter in particular).

DISCLOSURE OF THE INVENTION

In view of the above-described circumstances, the method of manufacturing a retainer for a roller bearing and the retainer for a roller bearing in accordance with the invention have been invented to improve the efficiency of the manufacturing operation and realize the low cost of the retainer.

According to the invention, there is provided a method of manufacturing a retainer for a roller bearing which is made of a metal plate and has a tubular main portion, a plurality of pockets formed in the main portion intermittently concerning a circumferential direction and capable of retaining rollers rollably on respective inner sides thereof, and an outwardly oriented flange-like collar portion formed at an axial end of the main portion. This manufacturing method comprises the steps of: forming an annular intermediate material by subjecting the metal plate to die cutting; forming a second intermediate material by forming a plurality of through holes in the intermediate material intermittently concerning the circumferential direction; plastically deforming a portion of the second intermediate material excluding a radially outer end portion thereof into a tubular shape; and forming the portion plastically deformed into the tubular shape as the main portion, forming a portion corresponding to the radially outer end portion of the second intermediate material as the collar portion or a collar portion element for forming the collar portion, and forming portions corresponding to the through holes as the pockets.

The die cutting of the intermediate material and the operation of forming the through holes may be performed one after another, or may be performed simultaneously if the capacity of a press machine is sufficient.

In this manufacturing method, the radially outer end portion of the annular second intermediate material is utilized as the annular collar portion without being temporarily formed into a tubular shape. For this reason, the operation of forming this collar portion can be performed efficiently.

In addition, according to the invention, there is provided a method of manufacturing a retainer for a roller bearing, comprising the steps of: forming an annular intermediate material by subjecting the metal plate to die cutting; forming a second intermediate material by forming a plurality of through holes in the intermediate material intermittently concerning the circumferential direction; plastically deforming a portion of the second intermediate material excluding a radially outer end portion thereof into a tubular shape; cutting off the radially outer end portion; and forming the portion plastically deformed into the tubular shape as the main portion, and forming portions corresponding to the through holes as the pockets.

Accordingly, the plurality of through holes can be worked simultaneously without requiring an especially complex and large-scale working apparatus. As a result, it is possible to fabricate a retainer for a roller bearing of high quality at low cost.

Preferably, the method of manufacturing a retainer for a roller bearing in accordance with the invention comprises the step in which portions which are each present between a central hole of the second intermediate material and each of the through holes are each formed in an arch shape in which a respective intermediate portion projects in a radial direction of the second intermediate material relative to both end portions, and the step in which the arch-like portion is extended when the portion of the second intermediate material excluding the radially outer end portion thereof is plastically deformed into the tubular shape.

As a result, when the portion (radially inner portion) of the second intermediate material excluding the radially outer end portion thereof is plastically deformed into the tubular shape, it is possible to prevent the cross-sectional area of a portion between a central hole of this second intermediate material and the through hole from becoming small. For this reason, it is possible to prevent the occurrence of a drawback in that this portion is torn off in conjunction with the plastic deformation.

Preferably, in the method of manufacturing a retainer for a roller bearing in accordance with the invention, a portion of an outer peripheral edge of the intermediate material is left as connected to a portion of the metal plate when the annular intermediate material is formed by subjecting the metal plate to die cutting, and after the second intermediate material is formed by forming the plurality of through holes at least in the intermediate material, a portion of an outer peripheral edge of the second intermediate material is cut off from the portion of the metal plate.

Thus, since the plurality of through holes are formed in the intermediate material in the state in which the intermediate material is left as connected to the metal plate, the positioning of this intermediate material in the circumferential direction and the radial direction can be easily accomplished during the formation of these through holes. In addition, if the intermediate materials are consecutively fed (are moved intermittently by predetermined lengths) on a manufacturing line with the plurality of intermediate materials connected to the metal plate, the operation of forming the through holes in the respective intermediate materials can be performed efficiently.

More preferably, the method of manufacturing a retainer for a roller bearing in accordance with the invention comprises the step in which after the formation of the main portion and the plurality of pockets, those portions of the main portion corresponding to portions which are each present between a central hole of the second intermediate material and each of the through holes are subjected to plastic working, to thereby render the plate thickness of the portion subjected to the plastic working greater than the plate thickness of a remaining portion of the main portion.

Accordingly, it is possible to sufficiently ensure the rigidity of the portion having the enlarged plate thickness and a portion in the vicinity thereof in the completed retainer for a roller bearing without increasing the axial dimensions of these portions. In addition, it is possible to enlarge areas of inner surfaces (side surfaces opposing end faces of the plurality of rollers during use) of the portions having enlarged plate thickness. For this reason, the end faces of the plurality of rollers during use can be guided with wide areas by the inner surfaces having the enlarged plate thickness, thereby making it possible to stabilize the attitude of these rollers. Furthermore, when, at the time of assembling the roller bearing, the inner surfaces of the portions having the enlarged plate thickness are used as guiding surfaces when inserting the rollers into the respective pockets, the inserting operation of these rollers can be easily effected.

According to the invention, there is provided a retainer for a roller bearing which is made of a metal plate, comprising: a tubular main portion; a plurality of pockets formed in the main portion intermittently concerning a circumferential direction and capable of retaining rollers rollably on respective inner sides thereof; and an outwardly oriented flange-like collar portion formed at an axial end of the main portion, wherein an annular intermediate material is formed by subjecting the metal plate to die cutting, and after a second intermediate material is formed by forming a plurality of through holes in the intermediate material intermittently concerning the circumferential direction, a portion of the second intermediate material excluding a radially outer end portion thereof is plastically deformed into a tubular shape, whereby the portion plastically deformed into the tubular shape is formed as the main portion, a portion corresponding to the radially outer end portion of the second intermediate material is formed as the collar portion or a collar portion element for forming the collar portion, and portions corresponding to the through holes are formed as the pockets.

In addition, according to the invention, there is provided a retainer for a roller bearing which is made of a metal plate, comprising: a tubular main portion; and a plurality of pockets formed in the main portion intermittently concerning a circumferential direction and capable of retaining rollers rollably on respective inner sides thereof, wherein an annular intermediate material is formed by subjecting the metal plate to die cutting, and after a second intermediate material is formed by forming a plurality of through holes in the intermediate material intermittently concerning the circumferential direction, a portion of the second intermediate material excluding a radially outer end portion thereof is plastically deformed into a tubular shape, the radially outer end portion being subsequently cut off, whereby the portion plastically deformed into the tubular shape is formed as the main portion, and portions corresponding to the through holes are formed as the pockets.

Figure 1:
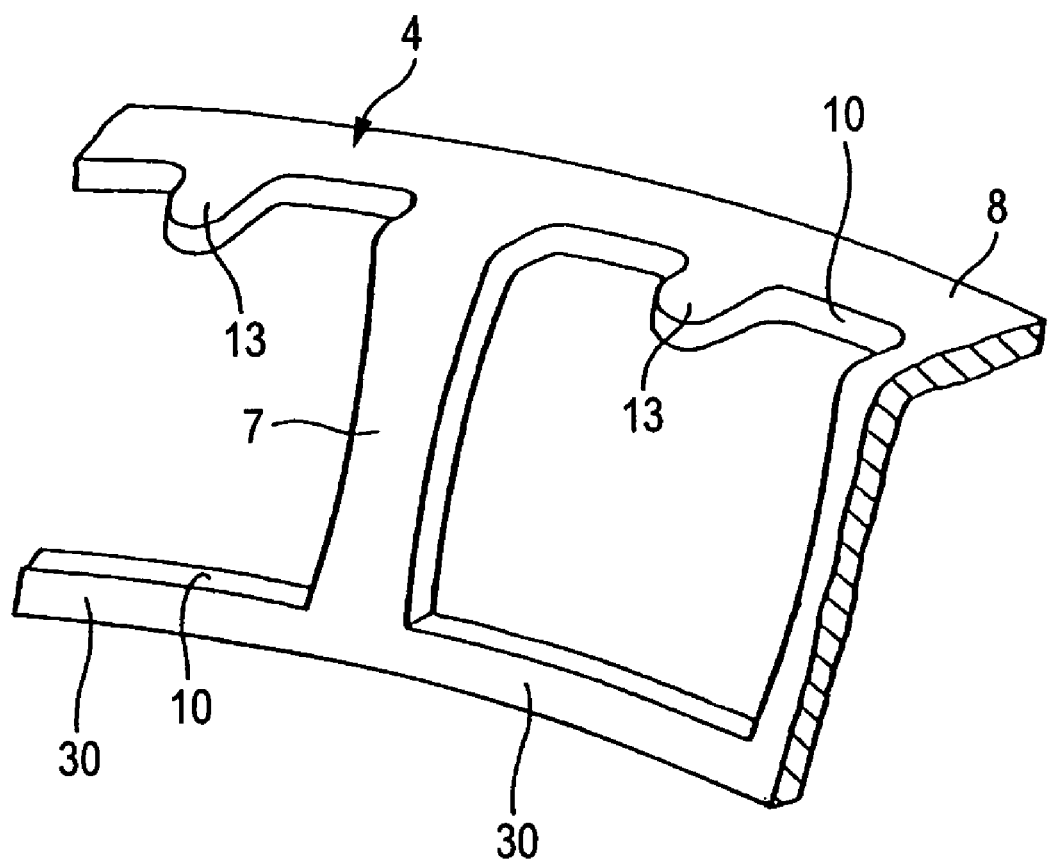
FIG. 1 is a partial perspective view illustrating a retainer which is fabricated in accordance with a first embodiment of the invention.

It should be noted that, in the drawings, reference numeral 1 denotes an outer ring; 2, an inner ring; 3, a barrel roller; 4, 4a, 4b, retainers; 5, an outer ring race; 6, an inner ring race; 7, a main portion; 8, 8a, a large diameter-side collar portion; 10, 10a, pockets; 11, a guide ring; 12, a recessed portion; 13, a tongue; 14, a second intermediate material; 15, a bottom portion; 16, a third intermediate material; 17, a conical tube-shaped portion; 18, 18a, 18b, through holes; 19, a fourth intermediate material; 20, a tongue element; 21, a distal end portion; 22, a fifth intermediate material; 23, a large diameter-side collar portion; 24, a sixth intermediate material; 25, a seventh intermediate material; 26, an eighth intermediate material; 27, a ninth intermediate material; 28, 28a, first intermediate materials; 29, 29a, second intermediate materials; 30, 30a, belt-shaped portions; 31, 31a, third intermediate materials; 32, a receiving block; 33, a pressing block; 34, a punch part; 35, large diameter-side collar portion; 36, a fourth intermediate material; 37, a metal plate; and 38, a fourth intermediate material.

BEST MODE FOR CARRYING OUT THE INVENTION

First Embodiment

FIGS. 1 to 4 show a first embodiment of the invention. A main characteristic of this embodiment lies in a method of manufacturing a retainer 4 which is used by being incorporated into a self-aligning roller bearing. Hereafter, a description will be given centering on a characteristic portion of the first embodiment.

Figure 2A:
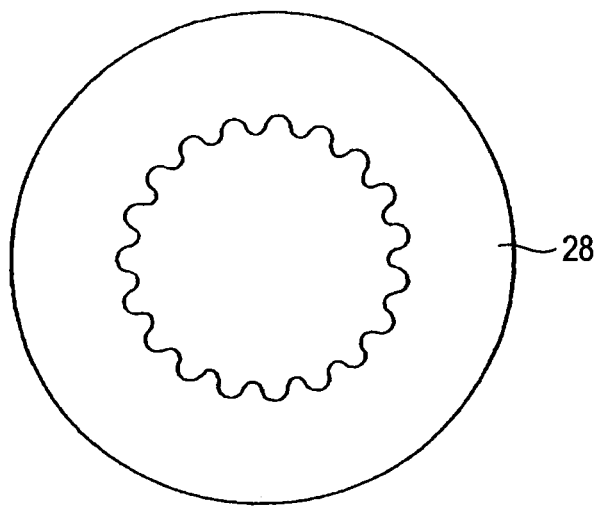
FIGS. 2A to 2C are process diagrams of the manufacturing method in accordance with the first embodiment.

In the case of this embodiment, to fabricate the retainer 4, an annular first intermediate material 28, such as the one shown in FIG. 2A and corresponding to an intermediate material described in the claims, is first formed by subjecting a metal plate serving as a basic material to die cutting by means of a press. The shape of an inner peripheral edge of this first intermediate material 28 is a corrugated shape concerning a circumferential direction.

Figure 2B:
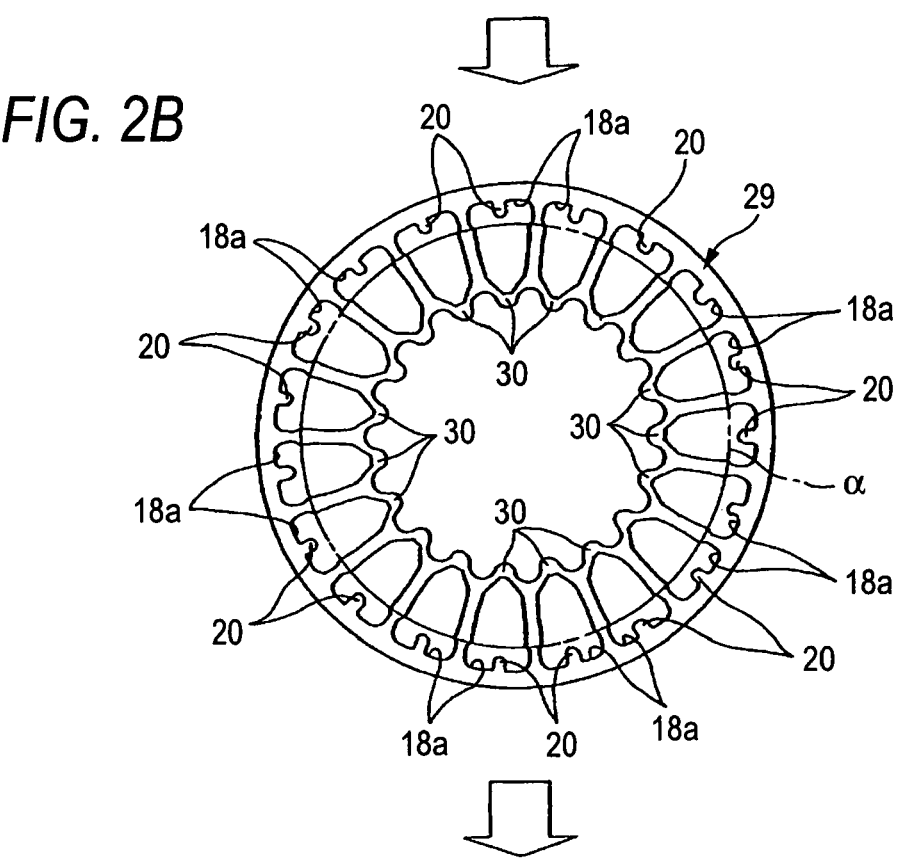

Next, through holes 18a, 18a are respectively formed at those portions of the first intermediate material 28 in each of which a phase concerning the circumferential direction agrees with a radially inwardly projecting portion of the inner peripheral edge of this first intermediate material 28, thereby forming a second intermediate material 29 as is shown in FIG. 2B. In the case of this embodiment, the operation of forming the through holes 18a, 18a is performed by die cutting by means of a press, and all the through holes 18a, 18a are die cut simultaneously. It should be noted that if the capacity of a press machine is sufficiently large, the metal plate can be die cut at a stroke into the second intermediate material 29. In addition, these through holes 18a, 18a respectively have shapes in which their widthwise dimension concerning the circumferential direction becomes smaller toward the radially inner side, and their radially inner end portion is made to enter the inner side of a radially inwardly projecting portion of the inner peripheral edge of the second intermediate material 29. As a result, belt-shaped portions 30, 30 which are each present between a central hole of the second intermediate material 29 and each of the through holes 18a, 18a are each formed in an arch shape in which a respective intermediate portion projects radially inwardly of both end portions. The projecting direction of this arch shape may be made opposite to the illustrated example. However, if the projecting direction of the arch shape is set in the illustrated direction, it can be made to ensure that a particularly narrow width portion is no present in a portion of a die for punching the through holes 18a, 18a, thereby making it possible to ensure the durability of the die. In addition, tongue elements 20, 20 are respectively formed at central portions of radially outer edges of the through holes 18a, 18a.

Figure 2C:
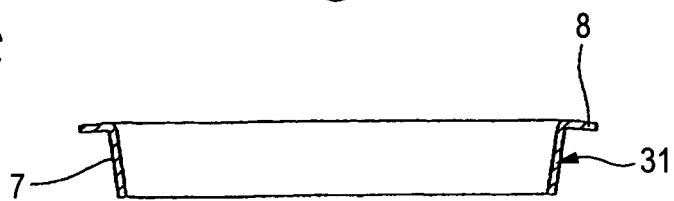
Figure 3A:
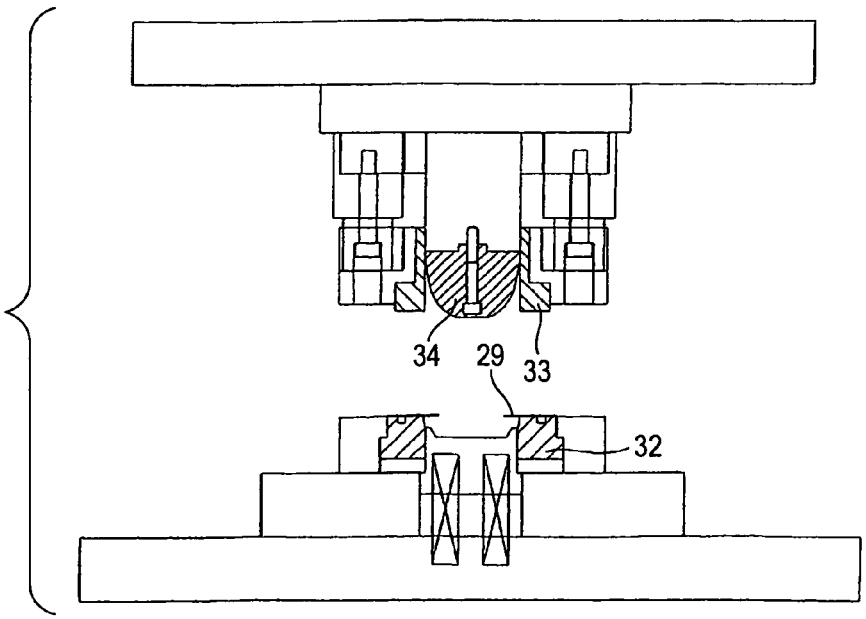
FIGS. 3A and 3B are schematic cross-sectional views of a press machine used when carrying out the first embodiment.
Figure 3B:
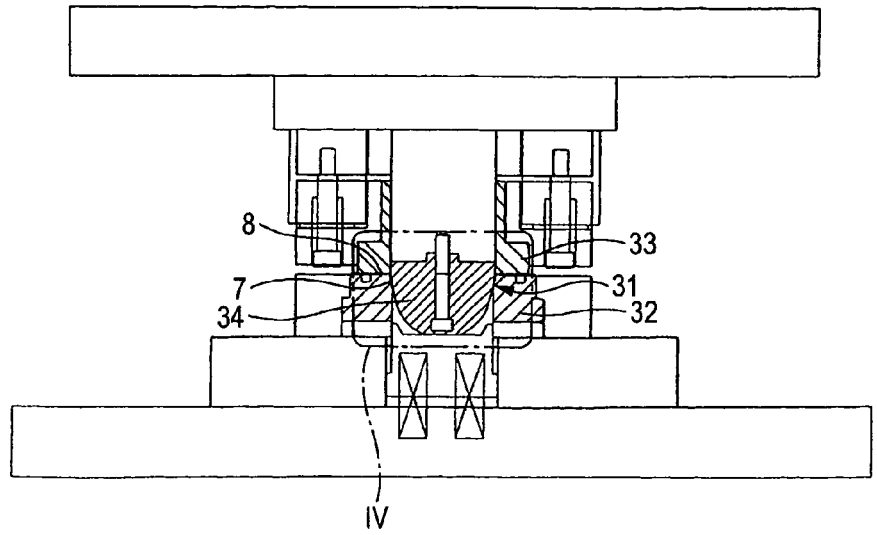
Figure 4:
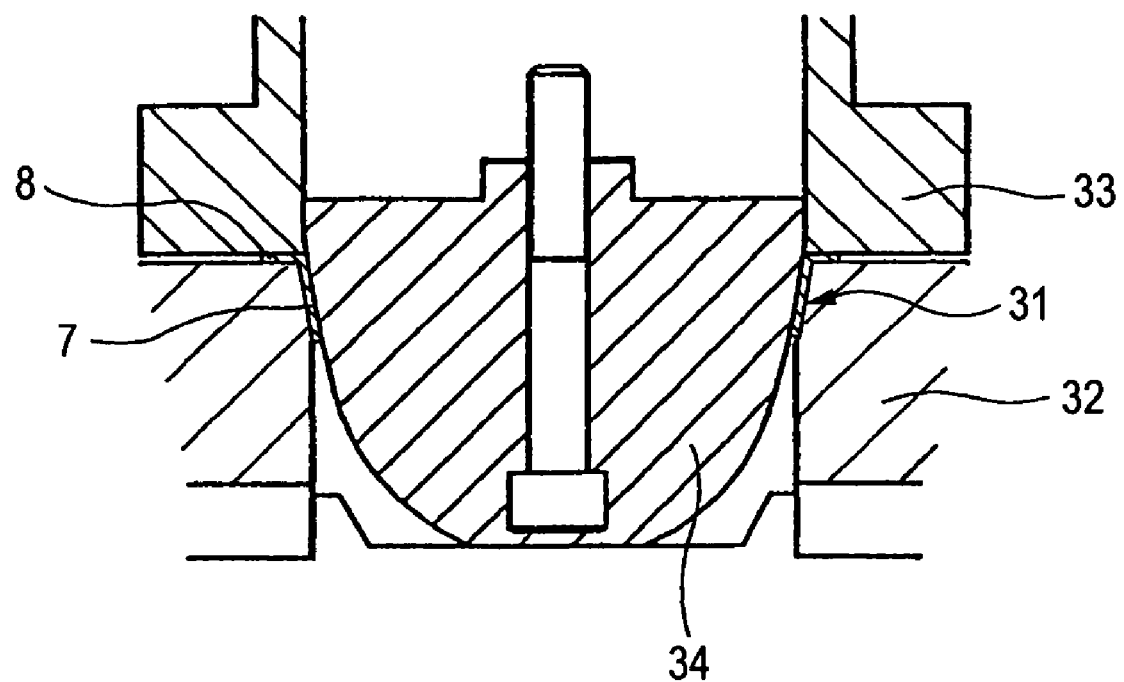
FIG. 4 is a partially enlarged view of a portion III in FIG. 3.

Next, a radially inner portion (a portion located radially inwardly of a chain line α in FIG. 2B) of the second intermediate material 29 is plastically deformed into the shape of a conical tube, to thereby obtain a third intermediate material 31 as is shown in FIG. 2C. When forming such a third intermediate material 31, as shown from FIG. 3A to FIG. 3B (FIG. 4), in a state in which a radially outer portion (a portion located radially outwardly of the chain line a in FIG. 2B) of the second intermediate material 29 is clamped by a receiving block 32 and a pressing block 33 which make up the press machine, a punch part 34 is pushed in while pressing the radially inner portion of this second intermediate material 29 in an axial direction and in the radially outward direction, thereby plastically deforming the radially inner portion of this second intermediate material 29 into the shape of a conical tube. In addition, in conjunction with the plastic deformation in this manner, the respective arch-like belt-shaped portions 30, 30 are respectively extended in the circumferential direction, as shown in FIG. 1. Accordingly, a reduction of the cross-sectional area of each of these belt-shaped portions 30, 30 can be suppressed. Further, the portion subjected to plastic deformation into the shape of a conical tube in the above-described manner is set as a main portion 7, and a portion corresponding to the radially outer end portion of the second intermediate material 29 is set as a large diameter-side collar portion 9. Further, portions corresponding to the respective through holes 18a, 18a are respective set as pockets 10, 10 (not shown in FIG. 2C; see FIG. 1).

Figure 16A:
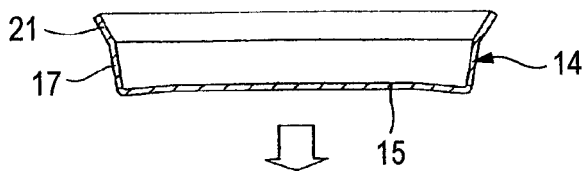
FIGS. 16A to 16I are process diagrams illustrating a conventional method of manufacturing a retainer.
Figure 16B:
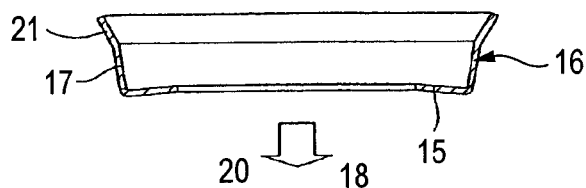
Figure 16C:
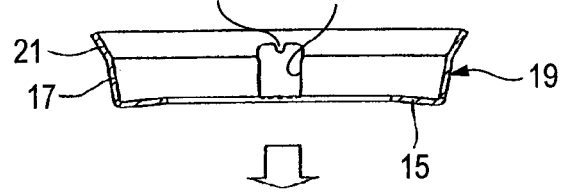
Figure 16D:
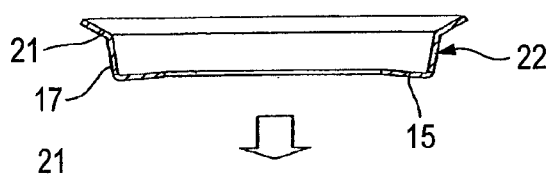
Figure 16E:
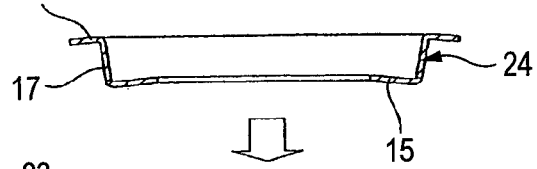
Figure 16F:
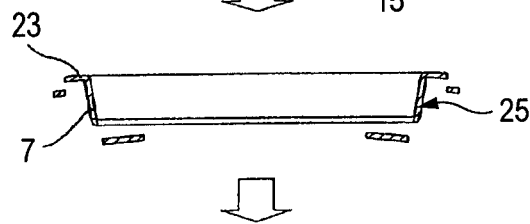
Figure 16G:
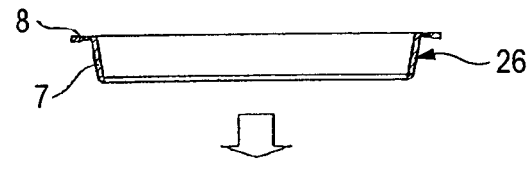
Figure 16H:
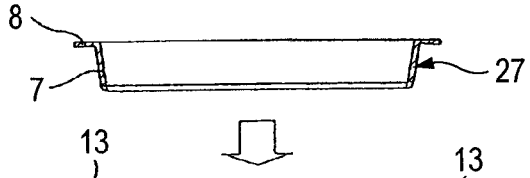
Figure 16I:
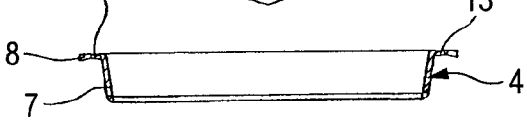

The structure of the third intermediate material 31 shown in FIG. 2C referred to above is similar to the structure shown in FIG. 16F referred to earlier. Accordingly, in the case of this embodiment, the third intermediate material 31 is subsequently subjected to working similar to that of FIGS. 16G to 16I referred to earlier, thereby completing the retainer 4.

As described above, in the case of the method of manufacturing a retainer for a roller bearing and the retainer for a roller bearing in accordance with this embodiment, the radially outer end portion of the annular second intermediate material 29 is utilized as the annular large diameter-side collar portion 8 without taking the trouble of temporarily forming it into a tubular shape. For this reason, the operation of forming this large diameter-side collar portion 8 can be performed efficiently. In addition, the plurality of through holes 18a, 18a can be worked simultaneously without requiring an especially complex working apparatus. In addition, when the radially inner portion of the second intermediate material 29 is plastically deformed into the shape of a conical tube, it is possible to prevent a reduction of the cross-sectional area of each of these belt-shaped portions 30, 30 which are each present between the central hole of the second intermediate material 29 and each of the through holes 18a, 18a. For this reason, it is possible to prevent the occurrence of a drawback in that these belt-shaped portions are torn off in conjunction with the plastic deformation. As a result, in the case of this embodiment, the retainer 4 of high quality can be fabricated at low cost.

Second Embodiment

Next, FIG. 5 shows a second embodiment of the invention. In the case of this embodiment, outside dimensions of first and second intermediate materials 28a and 29a shown in FIGS. 5A and 5B are made slightly larger than in the case of the first embodiment. Consequently, the widthwise dimension concerning the radial direction of that portion of the second intermediate material 29a which is clamped by the receiving block 32 and the pressing block 33 making up the press machine shown in FIGS. 3 and 4 (the portion located radially outwardly of a chain line a in FIG. 5B) is sufficiently secured. As a result, as shown from FIG. 3A to FIG. 3B (FIG. 4), when the radially inner portion of the second intermediate material 29a is plastically deformed by the punch part 34, it is ensured that the outside diameter side portion of this second intermediate material 29a is reliably prevented from falling off from the gap portion between the receiving block 32 and the pressing block 33 and being dragged in toward the inner side of this receiving block 32.

Figure 5A:
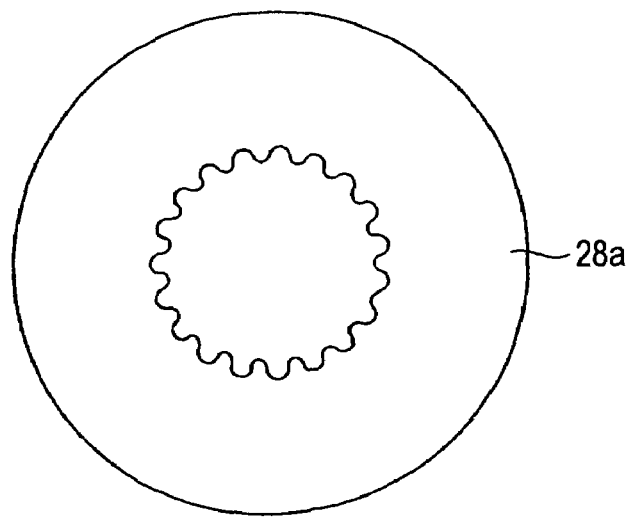
FIGS. 5A to 5D are diagrams illustrating the manufacturing method in accordance with a second embodiment in the order of steps.
Figure 5B:
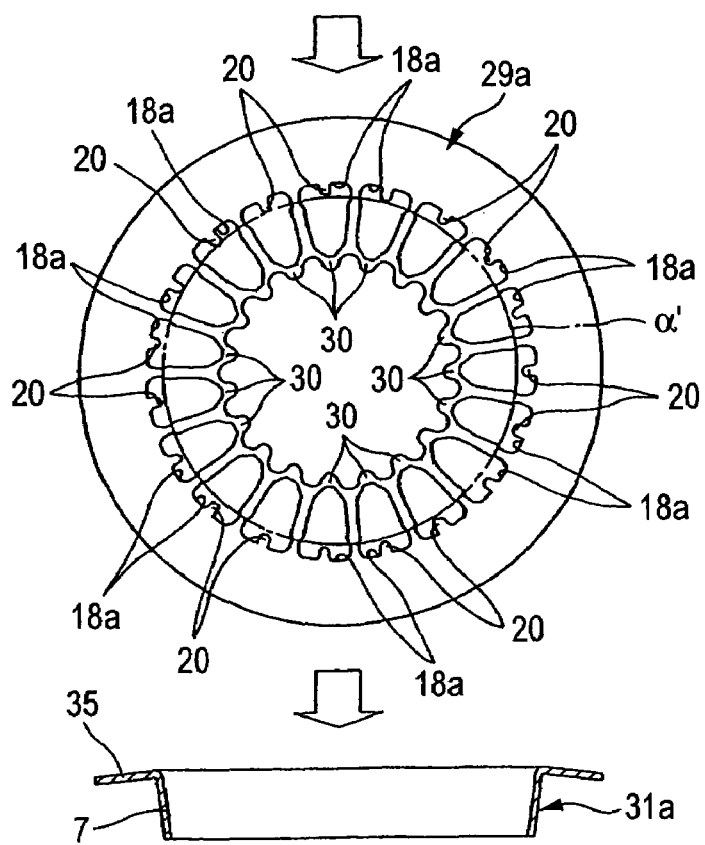
Figure 5C:
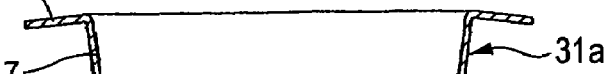
Figure 5D:
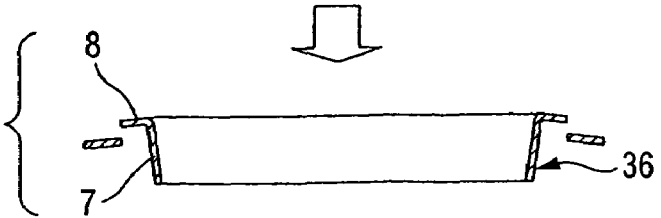

In addition, in the case of this embodiment, since the widthwise dimension concerning the radial direction of the radially outer end portion of the second intermediate material 29a which is clamped by the receiving block 32 and the pressing block 33 is made large, as described above, a large diameter-side collar portion preform 35 whose radial widthwise dimension is larger than that of the large diameter-side collar portion 8 after completion is formed at the large diameter-side edge of the main portion 7 making up a third intermediate material 31a as is shown in FIG. 5C. Accordingly, in the case of this embodiment, as shown from FIG. 5C to FIG. 5D, a radially outer end portion of this large diameter-side collar portion preform 35 is cut off by trimming the large diameter-side collar portion preform 35 so as to form the large diameter-side collar portion 8, thereby forming a fourth intermediate material 36 (the same as the third intermediate material 31 of the first embodiment shown in FIG. 2C referred to above) as is shown in FIG. 5D. The construction and operation of the other portions, including a subsequent working method, are the same as in the case of the above-described first embodiment.

Third Embodiment

Figure 6A:
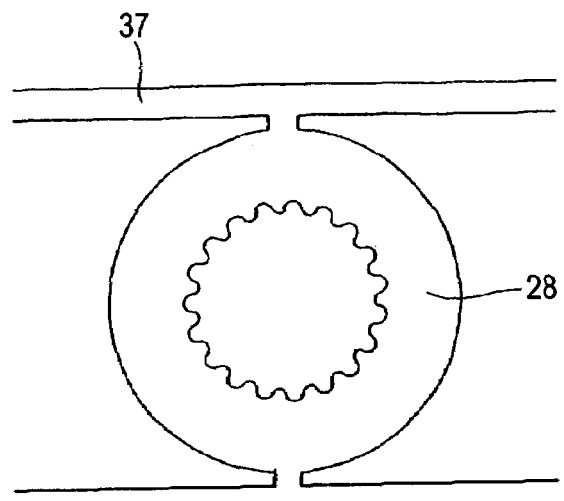
FIGS. 6A to 6C are diagrams illustrating the manufacturing method in accordance with a third embodiment in the order of steps.

FIG. 6 shows a third embodiment of the invention. In the case of the third embodiment, as shown in FIG. 6A, while a belt-shaped metal plate 37 serving as a basic material is being consecutively fed in the longitudinal direction, the annular first intermediate materials 28 are formed in a widthwise (vertically in FIG. 6) intermediate portion of this metal plate 37 by performing die cutting by means of a press. In addition, in the formed state, two diametrically opposite portions of the outer edge of the first intermediate material 28 are kept as connected respectively to portions of the metal plate 37. In addition, in the case of this embodiment, the first intermediate materials 28 are respectively formed at positions of equal intervals in the longitudinal direction of the metal plate 37 while the metal plate 37 is being fed in the longitudinal direction (in the left-and-right direction in FIG. 6) of this metal plate 37 in the same procedure.

Figure 6B:
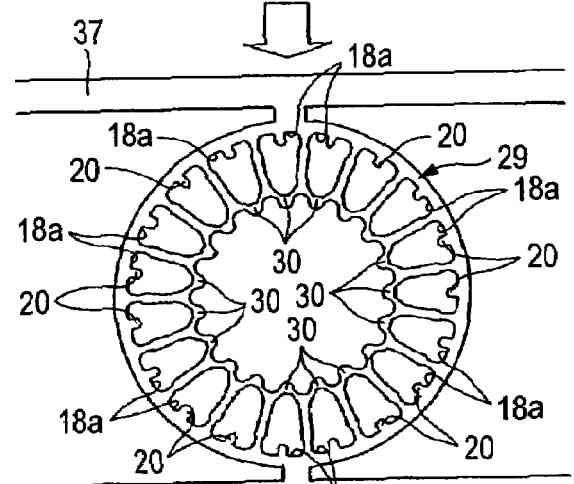
Figure 6C:
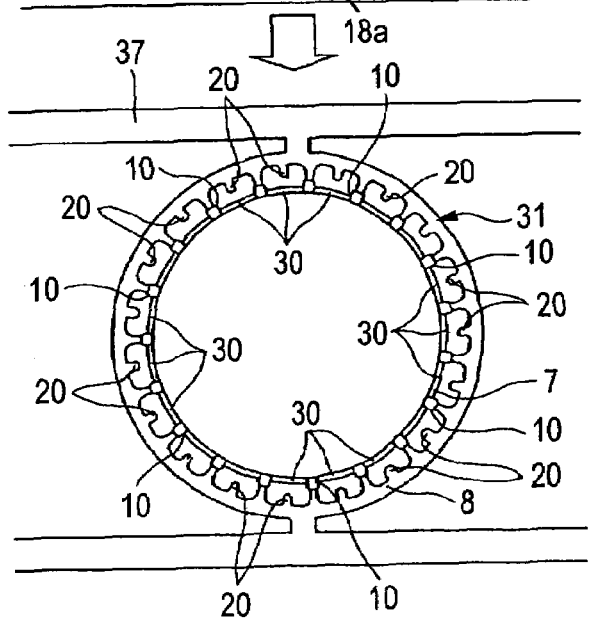

Next, in the case of this embodiment, the respective first intermediate materials 28 together with the metal plate 37 are consecutively fed on the manufacturing line in the longitudinal direction of the metal plate 37. Then, the plurality of through holes 18a, 18a are consecutively formed in these first intermediate materials 28, thereby working these first intermediate materials 28 into the second intermediate materials 29, as shown in FIG. 6B. Next, these second intermediate materials 29 together with the metal plate 37 are similarly fed consecutively on the manufacturing line in the longitudinal direction of the metal plate 37. Then, radially inner portions of these second intermediate materials 29 are consecutively plastically deformed into the shape of a conical tube, thereby respectively working these second intermediate materials 29 into the third intermediate materials 31, as shown in FIG. 6C. In addition, in the case of this embodiment as well, the second intermediate materials 29 are subsequently subjected to working similar to that of FIGS. 16G to 16I referred to above, thereby completing the retainers 4 (FIG. 1). It should be noted that, in the case of this embodiment, the operation of cutting off the intermediate material or the retainer 4 from the metal plate 37 is performed in some stage after the formation of the third intermediate material 31 (e.g., immediately after the formation of this third intermediate material 31 or completion of the retainer 4).

In the case of this embodiment described above, since the working with respect to the first and second intermediate materials 28 and 29 is carried out in a state in which these first and second intermediate materials 28 and 29 are left as connected to the metal plate 37, the positioning of these first and second intermediate materials 28 and 29 in the circumferential direction and the radial direction can be easily accomplished. In addition, during working, the plurality of intermediate materials can be integrally handled through the metal plate 37. For this reason, in the case of this embodiment, the working with respect to a plurality of intermediate materials can be performed efficiently, and the working time can be shorted, making it possible to attain a further reduction of the manufacturing cost.

Fourth Embodiment

Figure 17:
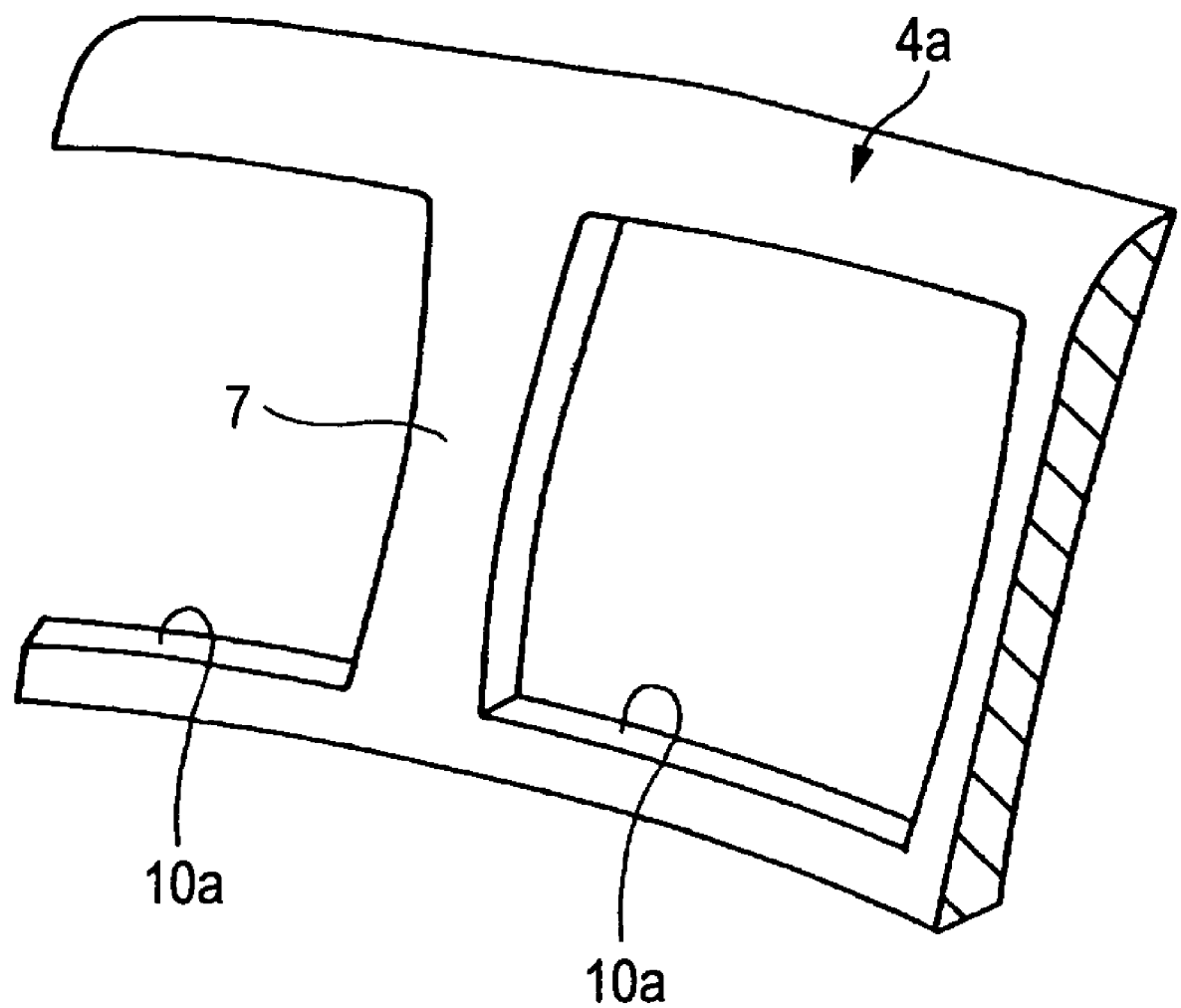
FIG. 17 is a partial perspective view illustrating another retainer.

FIG. 7 shows a fourth embodiment of the invention. A retainer 4a, which serves as an object of the manufacturing method of the embodiment, is one shown in FIG. 17 referred to earlier, i.e., one which does not have a collar portion on either end of the main portion 7. In the case of this embodiment, to fabricate such a retainer 4a, a third intermediate material 31b having a large diameter-side collar portion 8a is formed in the same working procedure as that in the case of the first embodiment shown in FIG. 2 referred to above, i.e., in the order of FIGS. 7A, 7B, and 7C. However, the shape of each of pockets 10a, 10a (FIG. 17) making up the retainer 4a, which serves as the object of this embodiment, is merely trapezoidal, so that the tongue elements 20 (see FIG. 2B) are not provided on the inner peripheral edges of respective through holes 18b, 18b formed in a second intermediate material 29b in FIG. 7B. In addition, in the case of this embodiment, a portion located radially inwardly of a chain line α" of the second intermediate material 29 is plastically deformed into the shape of a conical tube by the press machine shown in FIGS. 3 and 4 referred to above.

Figure 7A:
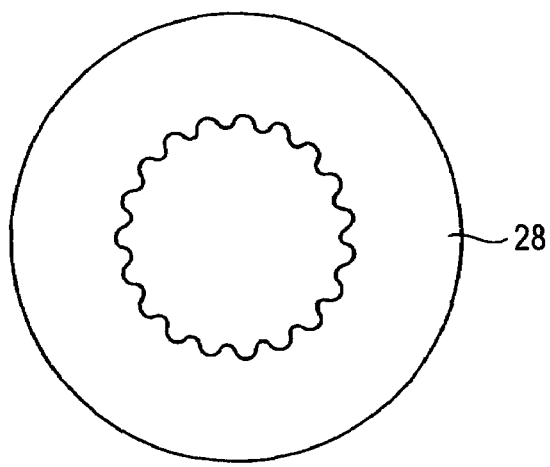
FIGS. 7A to 7D are diagrams illustrating the manufacturing method in accordance with a fourth embodiment in the order of steps.
Figure 7A:
Figure 7B:
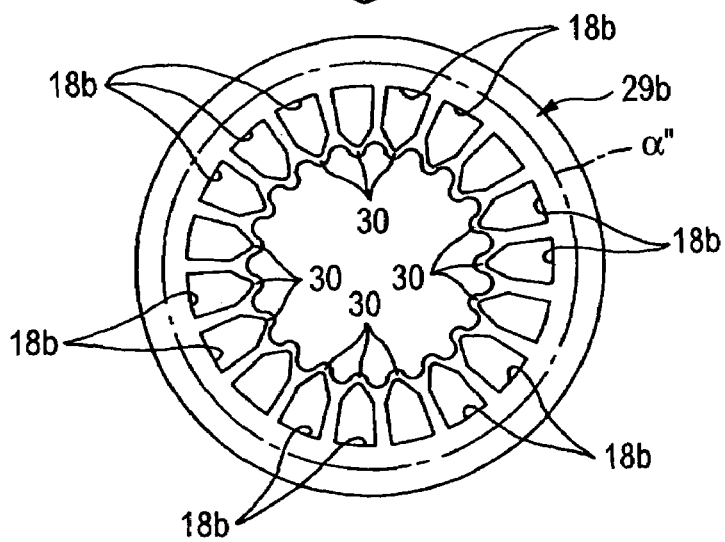
Figure 7B:
Figure 7C:
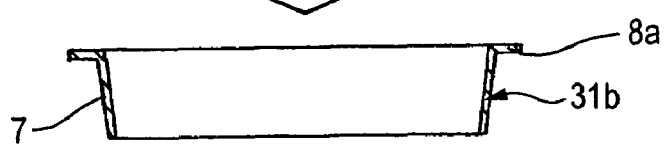
Figure 7C:
Figure 7D:
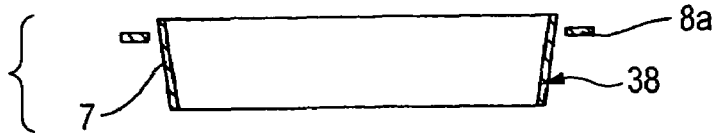
Figure 8A:
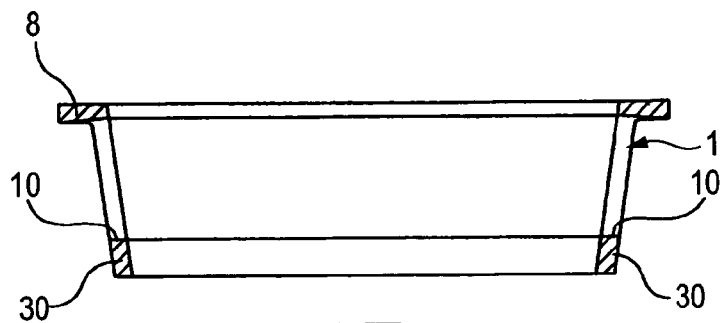
FIGS. 8A and 8B are diagrams illustrating the manufacturing method in accordance with a fifth embodiment in the order of steps.

After the third intermediate material 31b having the large diameter-side collar portion 8a, as is shown in FIG. 7C has been formed in the above-described manner, this large diameter-side collar portion 8a is then removed by means of a press, thereby forming a fourth intermediate material 38, as is shown in FIG. 8D. Subsequently, inner peripheral edges of the pockets 10a, 10a formed in the main portion 7 making up this fourth intermediate material 38 are subjected to surface pressing or the like so as to adjust the shape and dimensions of these pockets 10a, 10a, thereby completing the retainer 4a.

It should be noted that also in the case of fabricating the retainer 4a, if working is performed with portions of the respective intermediate materials kept connected to the metal plate serving as the basic material, it is possible to attain a reduction of the manufacturing cost.

Fifth Embodiment

Figure 8B:
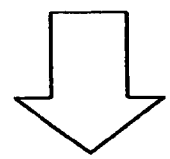
Figure 8B:
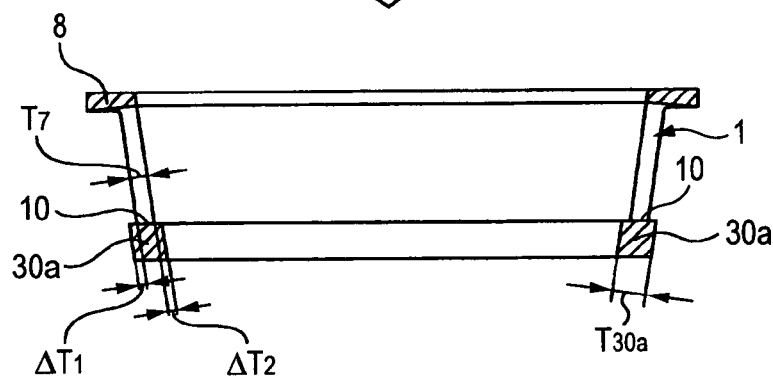
Figure 9:
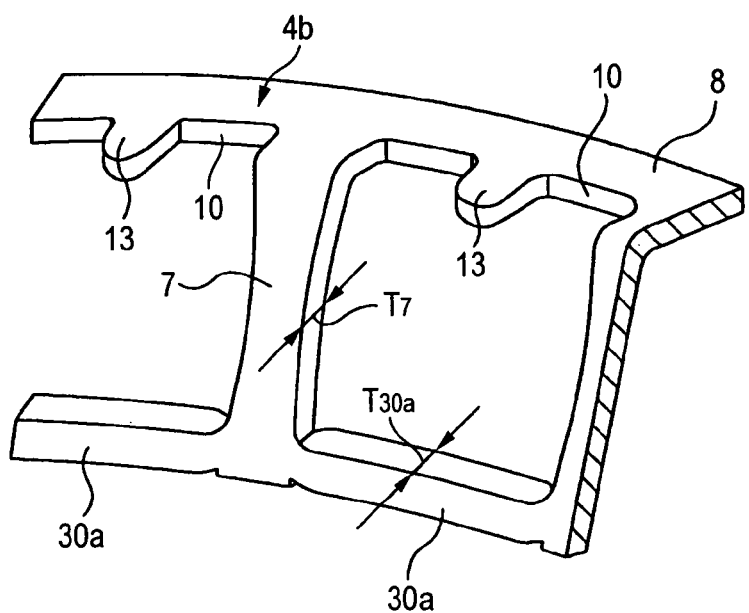
FIG. 9 is a partial perspective view illustrating the retainer in accordance with the fifth embodiment.
Figure 10:
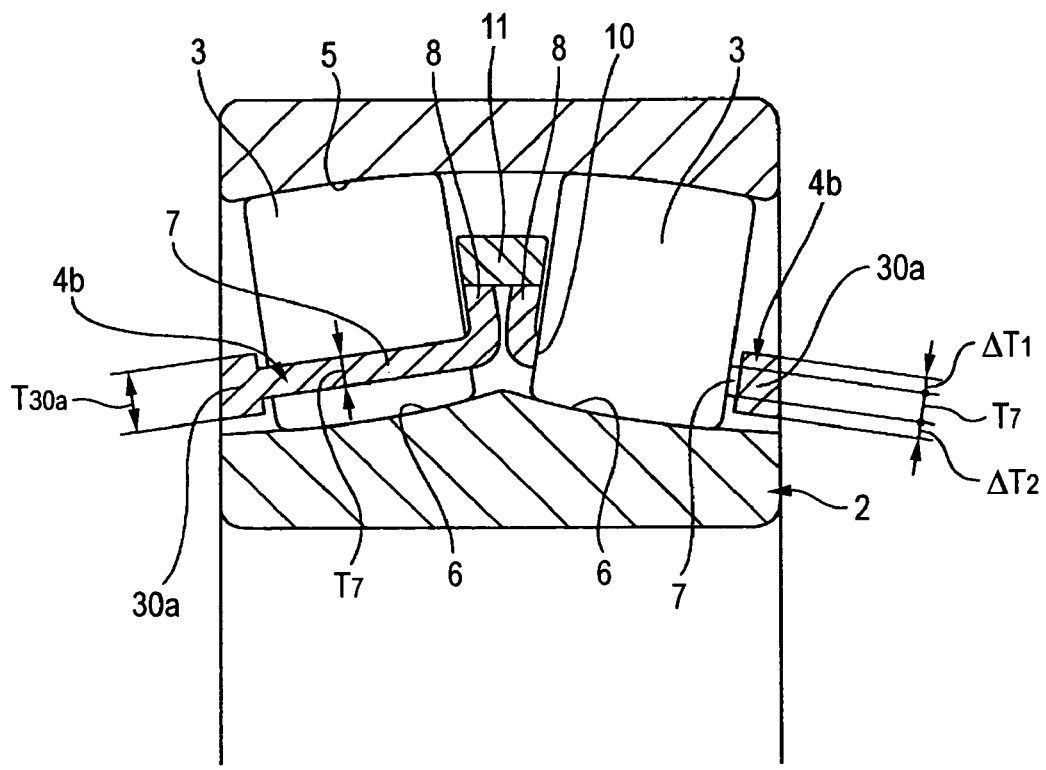
FIG. 10 is a partial cross-sectional view of a self-aligning roller bearing in which the retainers of the fifth embodiment are incorporated.
Figure 11:
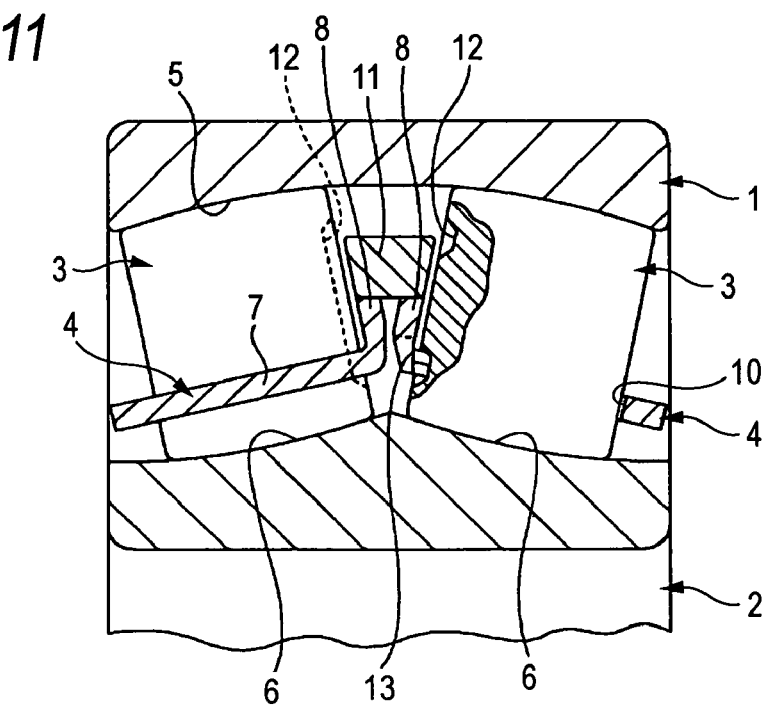
FIG. 11 is a partial cross-sectional view of the self-aligning roller bearing in which the retainers are incorporated.
Figure 12:
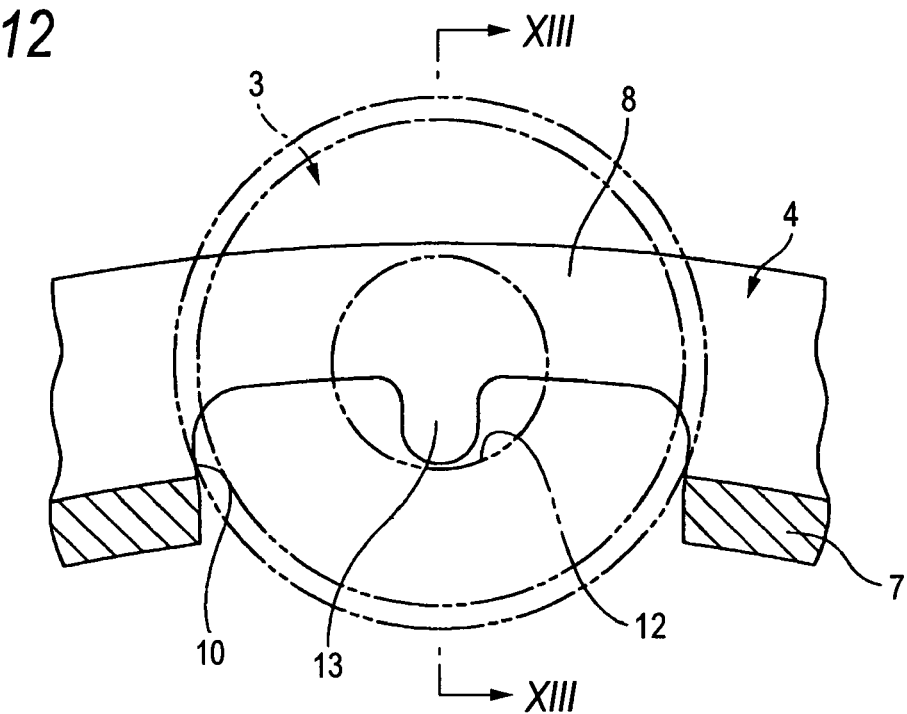
FIG. 12 is a cross-sectional view taken in the direction of arrows XII-XII of FIG. 13, and illustrates the retainer removed.

FIGS. 8 to 10 show a fifth embodiment of the invention. In the case of fabricating a retainer 4b of the fifth embodiment, the metal plate is first subjected to predetermined working in the same way as in the cases of the first embodiment shown in FIG. 2 referred to above, the second embodiment shown in FIG. 5, and the third embodiment shown in FIG. 6, so as to fabricate an intermediate material having the conical tube-shaped main portion 7, the plurality of pockets 10, 10, and the large diameter-side collar portion 8. Subsequently, the belt-shaped portions 30, 30 provided at the small diameter-side end portion of the main portion 7 are respectively plastically deformed by being compressed in the direction of the generating line (or in the axial direction) of this main portion 7. As a result, the plate thickness $T_{30a}$ ($=T_7+\Delta T_1+\Delta T_2$) of respective belt-shaped portions 30a, 30a is made greater than the plate thickness $T_7$ of the remaining portions of the main portion 7 ($T_{30a}>T_7$), as shown in FIG. 8B and FIGS. 9 and 10. It should be noted that, in FIGS. 8 and 10, the dimension $\Delta T_1$ of the belt-shaped portion 30a denotes an amount of increase in the cross-sectional height toward the radially outer side of the retainer 4b and the dimension AT2 similarly denotes an amount of increase in the cross-sectional height toward the radially inner side thereof as a result of the fact that the belt-shaped portion 30 before compression is plastically deformed. It should be noted that in the case of this embodiment, inner surfaces of the belt-shaped portions 30a, 30a formed in the above-described manner (the side surfaces opposing end faces of the rollers 3, 3 during use) are respectively formed as single flat surfaces.

In the above-described manner, in the case of the retainer 4b of this embodiment, the plate thickness $T_{30a}$ of the respective belt-shaped portions 30a, 30a is made greater than the plate thickness $T_7$ of the remaining portions of the main portion 7 ($T_{30a}>T_7$). For this reason, the rigidity of these belt-shaped portions 30a, 30a can be sufficiently ensured without increasing the dimensions of the belt-shaped portions 30a, 30a concerning the direction of the generating line (or the axial direction). In addition, areas of the inner surfaces of these belt-shaped portions 30a, 30a can be enlarged. For this reason, the end faces of the plurality of rollers 3, 3 during use can be guided with wide areas by the inner surfaces of these belt-shaped portions 30a, 30a, thereby making it possible to stabilize the attitude of these rollers 3, 3. Furthermore, when, at the time of assembling the roller bearing, the inner surfaces of the belt-shaped portions 30a, 30a are used as guiding surfaces when inserting the rollers 3, 3 into the respective pockets 10, 10, the inserting operation of these rollers 3, 3, can be easily effected.

Figure 13:
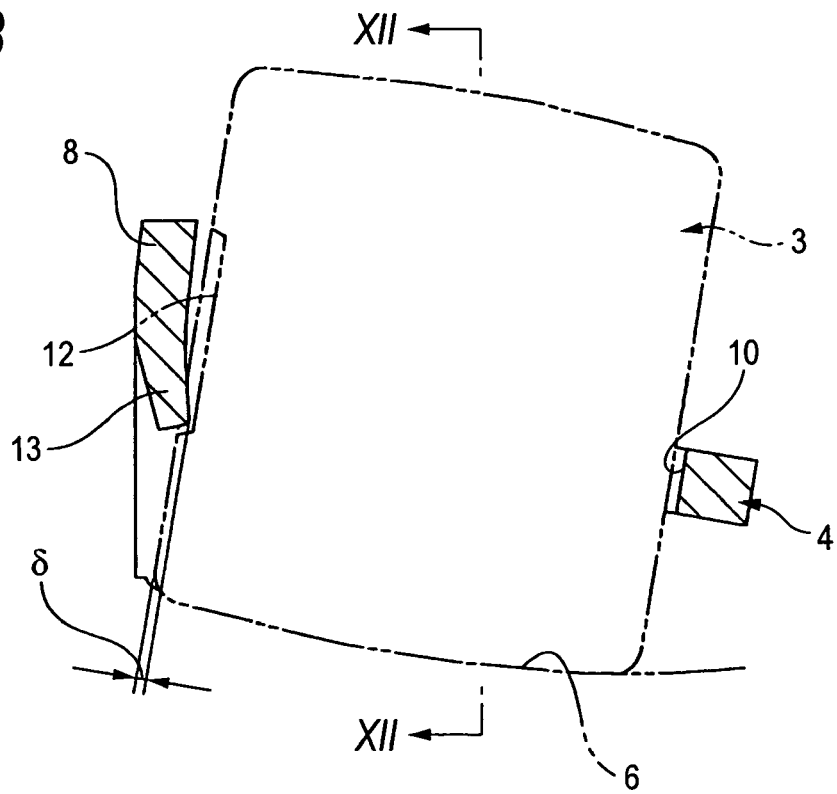
FIG. 13 is a cross-sectional view taken in the direction of arrows XIII-XIII of FIG. 12.
Figure 14:
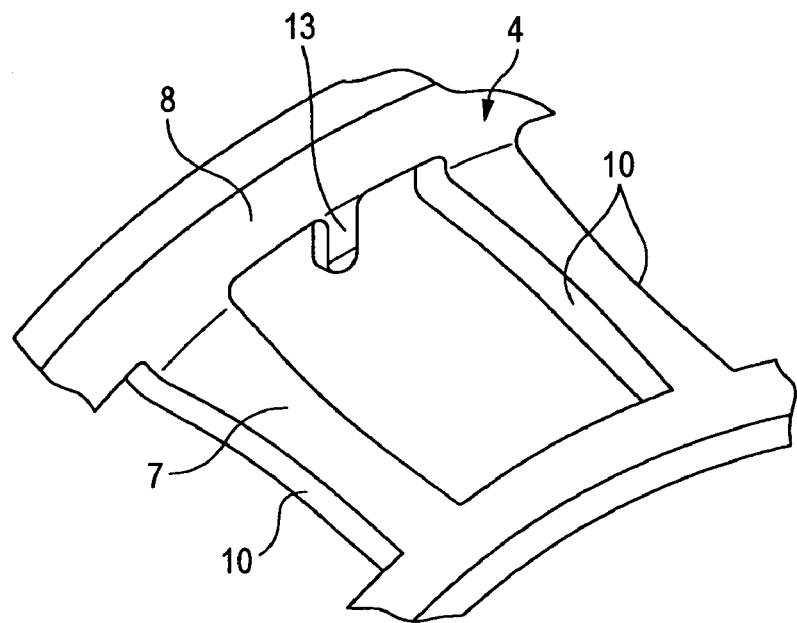
FIG. 14 is a partial perspective view, taken from the outer peripheral side, of the retainer.
Figure 15:
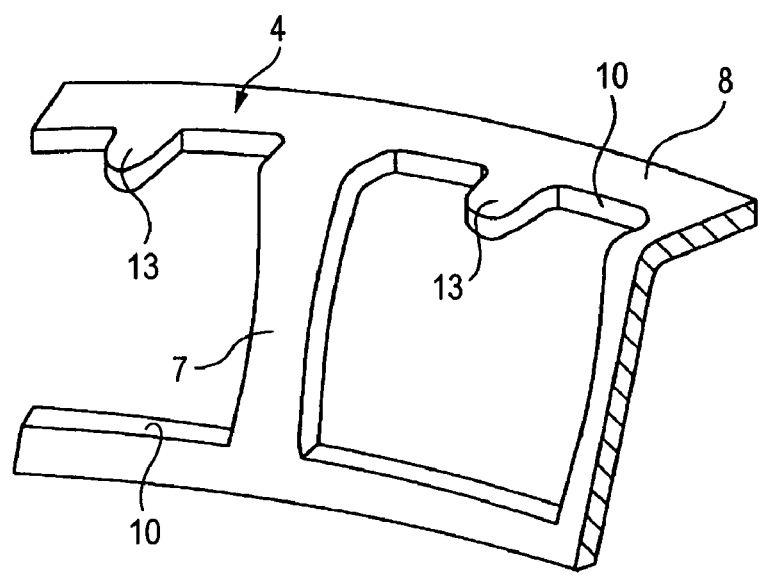
FIG. 15 is a partial perspective view, taken from the inner peripheral side, of the retainer.

In the above-described embodiments, in order to adjust the plurality of pockets 10, 10a to a desired shape and size, after these pockets 10, 10a are formed in conjunction with the formation of the conical tube-shaped main portion 7, the peripheral edge portions of these pockets 10, 10a are subjected to surface pressing (the operation of FIGS. 13G to 13H is performed). However, in the case where the invention is carried out into practice, these pockets 10, 10a may be formed to a desired shape and size simultaneously with the formation of these pockets 10, 10a by subjecting the peripheral edge portions of the through holes 18a, 18b before the formation of the pockets 10, 10a to the surface pressing in advance. The surface pressing can be simultaneously provided more easily to the plurality of peripheral edge portions in the case of providing it to the peripheral edge portions of the through holes 18a, 18b formed in the annular second intermediate materials 29, 29a, 29b than in the case of providing it to the peripheral edge portions of the pockets 10, 10a formed in the conical tube-shaped main portion 7. Accordingly, the adoption of the method of providing the surface pressing to the peripheral edge portions of the through holes 18a, 18b in the above-described manner shortens the working time and facilitates the reduction in the manufacturing cost.

It should be noted that the method of manufacturing a retainer for a roller bearing in accordance with the invention can be implemented regardless of the kind of roller bearing (self-aligning roller bearing, cylindrical roller bearing, tapered roller bearing, etc.) into which the retainer for a roller bearing is incorporated, insofar as the retainer for a roller bearing has a tubular main portion (in the case of the invention according to claim 1, plus an outwardly oriented flange-like collar portion which is bent radially outwardly from an axial end of this main portion).

Although the present invention has been described in detail and with reference to specific embodiments, it will be apparent to those skilled in the art that various changes and modifications may be made thereto without departing from the spirit and scope of the invention.

This application is based on the Japanese patent application (Japanese Patent Application No. 2003-290455) filed on Aug. 8, 2003 and the Japanese patent application (Japanese Patent Application No. 2004-210946) filed on Jul. 20, 2004, the contents of which are incorporated herein by reference.

INDUSTRIAL APPLICABILITY

The present invention is applicable to a retainer for a roller bearing for rollably retaining a plurality of rollers in a roller bearing which is applied to a rotatively supporting portion for making up various machine equipment and which uses rollers as rolling elements, as well as a method of manufacturing a retainer for a roller bearing.

The invention claimed is:

1. A method of manufacturing a retainer for a roller bearing which is made of a metal plate and has a tubular main portion, a plurality of pockets formed in the main portion intermittently concerning a circumferential direction and capable of retaining rollers rollably on respective inner sides thereof, and an outwardly oriented flange-like collar portion formed at an axial end of the main portion, comprising the steps of: forming an annular intermediate material by subjecting the metal plate to die cutting; forming a second intermediate material by forming a plurality of through holes in the intermediate material intermittently concerning in the circumferential direction; plastically deforming an entire portion of the second intermediate material excluding a radially outer end portion thereof into a tubular shape; and forming the portion plastically deformed into the tubular shape as the main portion, forming a portion corresponding to the radially outer end portion of the second intermediate material as the collar portion or a collar portion element for forming the collar portion, and forming portions corresponding to the through holes as the pockets; wherein portions connecting a central hole of the second intermediate material and each of the through holes are formed in an arch shape in which a respective intermediate portion projects in an inward radial direction of the second intermediate material relative to both end portions, and the arch shape portion is extended circumferentially when the portion of the second intermediate material excluding the radially outer end portion thereof is plastically deformed into the tubular shape.

2. The method of manufacturing a retainer for a roller bearing according to claim 1, wherein a portion of an outer peripheral edge of the intermediate material is left as connected to a portion of the metal plate when the annular intermediate material is formed by subjecting the metal plate to die cutting, and after the second intermediate material is formed by forming the plurality of through holes at least in the intermediate material, a portion of an outer peripheral edge of the second intermediate material is cut off from the portion of the metal plate.

3. The method of manufacturing a retainer for a roller bearing according to claim 1, wherein after the formation of the main portion and the plurality of pockets, those portions of the main portion corresponding to portions which are each present between a central hole of the second intermediate material and each of the through holes are subjected to plastic working, to thereby render the plate thickness of the portion subjected to the plastic working greater than the plate thickness of a remaining portion of the main portion.

4. The method of manufacturing a retainer for a roller bearing according to claim 1, wherein the inner circumference has a wave shape.

\* \* \* \* \*